United States Patent [19]

Cuff

[11] 4,095,460

[45] Jun. 20, 1978

[54] DEVICE FOR CONVERTING ROTARY MOTION INTO UNIDIRECTIONAL MOTION

[76] Inventor: Calvin I. Cuff, 135 Ocean Ave., Brooklyn, N.Y. 11225

[21] Appl. No.: 707,017

[22] Filed: Jul. 20, 1976

[51] Int. Cl.[2] .............................................. F16H 27/04

[52] U.S. Cl. ...................................................... 74/84 S

[58] Field of Search ................................... 74/84 S, 55

[56] References Cited

U.S. PATENT DOCUMENTS

| | | | |
|---|---|---|---|
| 1,445,474 | 2/1923 | Benson et al. | 74/55 |
| 2,009,780 | 7/1935 | Laskowitz | 74/84 S |
| 2,532,320 | 12/1950 | Maussnest | 74/55 |
| 3,108,580 | 10/1963 | Crane, Jr. | 74/55 |
| 3,468,174 | 9/1969 | Muller | 74/55 |
| 3,998,107 | 12/1976 | Cuff | 74/84 S |

*Primary Examiner*—Samuel Scott
*Assistant Examiner*—Wesley S. Ratliff, Jr.

[57] ABSTRACT

An improved mechanism is disclosed for varying the radius of gyration of a plurality of gyrating masses and for selectively changing the direction of the resultant unbalanced force produced by these gyrating masses. The improved mechanism is comprised of a pair of normally non-rotating, eccentrically disposed, circular cams which engage a pair of cam followers which are attached to connecting rods which in turn are connected to the gyrating masses. The direction of the resultant unbalanced force is selectively changed by simply rotating, in unison, the pair of normally non-rotating cams.

3 Claims, 10 Drawing Figures

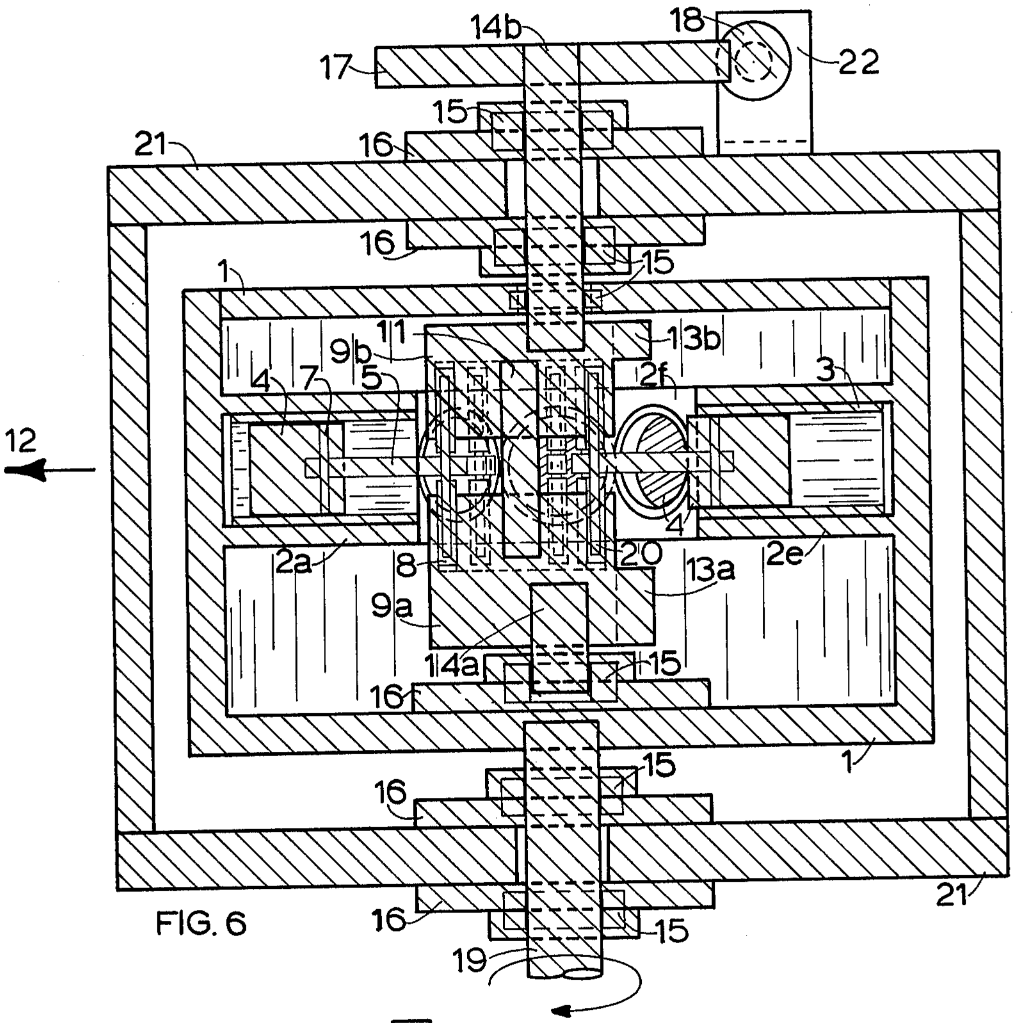
FIG. 6
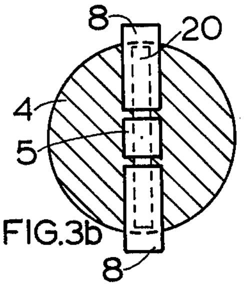
FIG. 3b
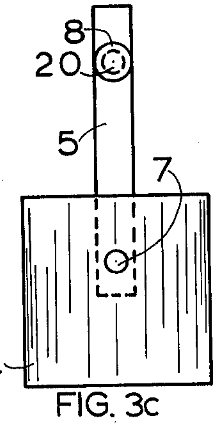
FIG. 3c
FIG. 4a
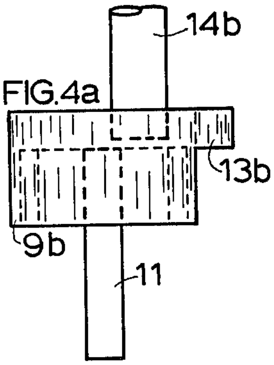
FIG. 4b
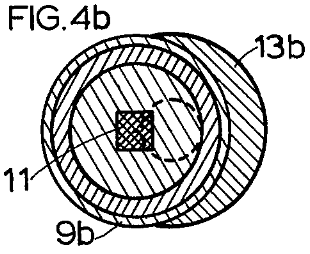
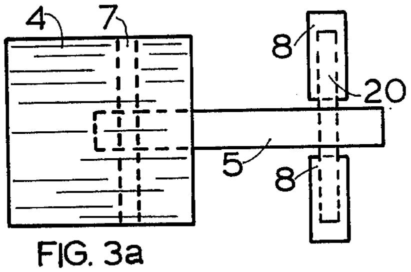
FIG. 3a
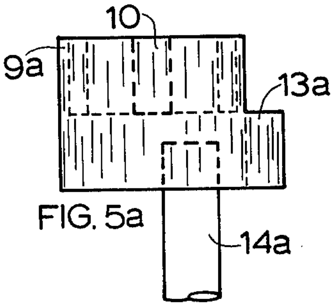
FIG. 5a
FIG. 5b
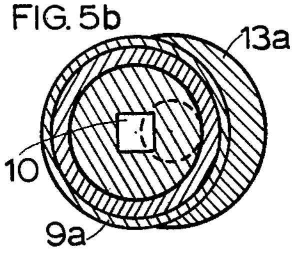

DEVICE FOR CONVERTING ROTARY MOTION INTO UNIDIRECTIONAL MOTION

CROSS-REFERENCE TO PRIOR APPLICATIONS

| Serial No. | Filing Date | |
|---|---|---|
| 486,700 | July 8, 1974 | (Abandoned) |
| 518,702 | Oct. 29, 1974 | (Now patent 3,998,107) |

BACKGROUND OF THE INVENTION

1. Field of the Invention

Along with rocket and jet engines, devices that convert rotary motion into unidirectional motion share the unique characteristic of not requiring engagement with a reactive medium in order to produce a propulsive force. One method of producing an unbalanced centrifugal force is to vary the radius of gyration of a plurality of gyrating masses continuously during their cycle of revolution and in such a manner that each gyrating mass in succession moves through both a maximum-radial-distance predetermined position and a minimum-radial-distance predetermined position during the cycle of revolution. The maximum-radial-distance and the minimum-radial-distance predetermined positions are 180°, or a half-cycle of revolution, apart.

Since the magnitude of the centrifugal force, which is produced by a gyrating mass, is proportional to the radius of gyration of the gyrating mass, the sum of the centrifugal force components which are produced by those gyrating masses which are, at a given moment, just approaching, just leaving, and positioned at the maximum-radial-distance predetermined position exceeds the sum of the centrifugal force components which are produced by those gyrating masses which are, at the same given moment, just approaching, just leaving, and positioned at the minimum-radial-distance predetermined position, there is thus a net imbalance of centrifugal force components which can be used to propel a vehicle.

2. Description of the Prior Art

The prior art has provided several systems which, for one reason or another, suffer many disadvantages making them not acceptable to general usage, such as being overly complex to manufacture, require complex driving systems and critically interrelated rotating components, and the like.

An example is the device of I. B. Laskowitz which is described in U.S. Pat. Nos. 1,953,964 and 2,009,780. Laskowitz refers to his device as a "Centrifugal Variable Thrust Mechanism" and discloses a relatively complicated method for varying the magnitude and direction of the resultant unbalanced force. Since the magnitude of the resultant unbalanced force can be varied by simply varying the rate of rotation of the input drive shaft, the only useful function of Laskowitz's variable mechanism is in varying the direction of the resultant unbalanced force. A major problem of Laskowitz's device is that the point of application of the resultant force, relative to the axis of rotation of the gyrating masses, is dependent on the direction chosen for the resultant unbalanced force. This problem is due to Laskowitz's use of two mutually perpendicular shafts to transmit the resultant unbalanced force to two different positions on his device.

The device disclosed in this patent application overcomes all the difficulties inherent in Laskowitz's device. The mechanism disclosed in this patent application also offers improvements and advantages over the "Transmitting Mechanism" which is disclosed in U.S. Pat. No. 1,445,474 (dated Feb. 13, 1923). The "Transmitting Mechanism", which is described in U.S. Pat. No. 1,445,474, employes a circular ring, rather than springs, to keep the roller-type cam followers in contact with an eccentrically-disposed circular cam. The circular ring encircles all of the roller followers and is in rolling contact with each roller follower. The circular ring is thus rotated in a direction which is opposite to that of the eccentrically-disposed circular cam by traction between the circular ring's inner surface and the roller followers. A major fault of this "Transmitting Mechanism" is that, at any given instant, the roller followers are rotating at different rates, thus the rate of rotation of the circular ring can't correspond directly to the rate of rotation of any particular roller follower.

SUMMARY OF THE INVENTION

The prior art has provided various methods of supporting and varying the radius of gyration of the gyrating masses and of changing the direction of the resultant unbalanced force, but each of those methods suffers from one or more difficulties or disadvantages. The invention disclosed in this patent application overcomes those difficulties and disadvantages by a simple mechanism which is comprised of a pair of normally non-rotating circular cams which engage a pair of cam followers which are attached to connecting rods which in turn are connected to the gyrating masses.

The direction of the resultant unbalanced force can be selectively changed by simply rotating in unison the pair of normally non-rotating circular cams.

Counterweights are attached to each cam in such a manner that the combined mass of the cam and the counterweight is equally distributed about the axis of rotation of the gyrating masses. This prevents changes in the distribution of mass, relative to the center of mass of a vehicle which is being propelled by the device, when the cams are rotated to change the direction of the resultant unbalanced force.

BRIEF DESCRIPTION OF THE DRAWINGS

In the accompanying drawings forming a part of this specification, and in which like reference characters are employed to designate like parts throughout the same:

FIGS. 3*a*, 3*b*, and 3*c* illustrate, respectively, the side, the rear, and the top or bottom view of one of the gyrating masses and its associated connecting rod and cam followers;

FIGS. 4*a* and 4*b* illustrate, respectively, the side and bottom views of the top cam of FIG. 2;

FIGS. 5*a* and 5*b* illustrate, respectively, the side and top views of the lower cam of FIG. 2;

FIG. 6 illustrates a partial elevation of the invention in a cross-sectional view along the line 6 — 6 of FIG. 1.

DESCRIPTION OF THE PREFERRED EMBODIMENTS

Figure 1:
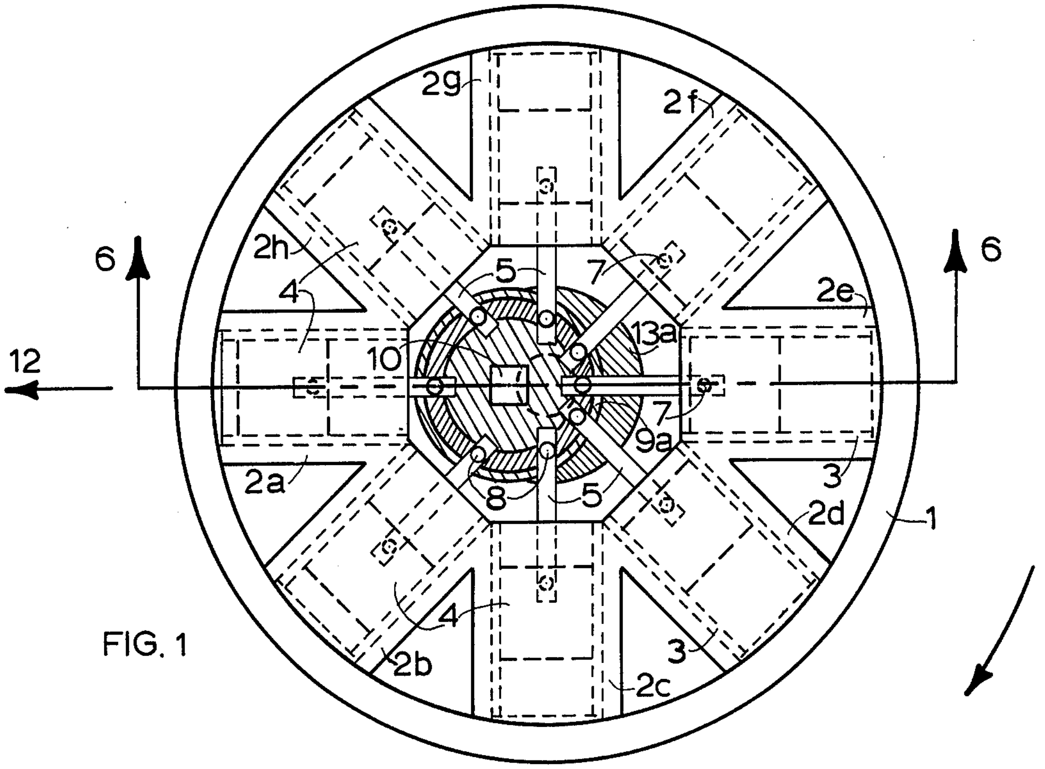
FIG. 1 illustrates a partial top plan view of the gyrating-mass support structure.

Referring now to the drawings in detail and in particular to FIG. 1, the gyrating-mass support structure, 1, contains eight, hollow, cylindrical chambers, *2a* – *2h*, each of which contains a bearing or bushing, 3. Mounted for sliding radial movement within each bearing or bushing, 3, is a cylindrical mass, 4. Each cylindrical mass, 4, is connected to one end of a connecting rod, 5, by means of a pin, 7. Mounted at the opposite end of and on opposite sides of each connecting rod, 5, are two roller-type cam followers, 8, each of which engages one of the eccentrically disposed, normally non-rotating, circular cams, *9a*, *9b* (cam *9b* is not illustrated in FIG. 1). Cam *9a* contains a square hole, 10, which receives an end of a square shaft, 11, (not illustrated in FIG. 1) which protrudes from cam *9b* and which allows both cams, *9a*, *9b*, to be rotated in unison for purposes of changing the direction of the resultant unbalanced force which direction is indicated by arrow 12. The maximum-radial-distance predetermined position is illustrated by the position of chamber *2a* and the minimum-radial-distance predetermined position is illustrated by the position of chamber *2e*. Each cam, *9a*, *9b*, has a counterweight, *13a*, *13b* (*13b* is not illustrated in FIG. 1), attached to it. The combined mass of each cam, *9a*, *9b*, and its respective counterweight, *13a*, *13b*, is equally distributed about the axis of rotation of the gyrating masses and the gyrating-mass support structure 1, in order to prevent changes in the distribution of mass about the center of mass of a craft or vehicle which is being propelled by the device when the normally non-rotating cams *9a*, *9b*, are rotated to change the direction of the resultant unbalanced force.

Figure 2:
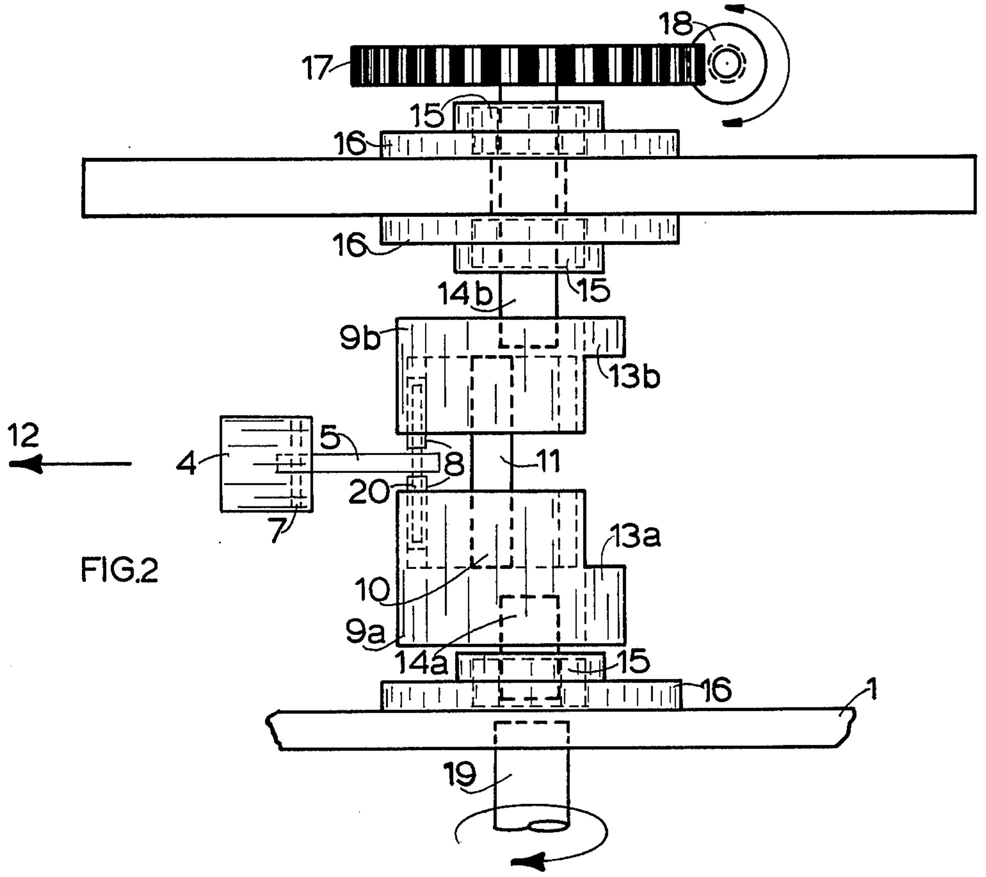
FIG. 2 illustrates a partial elevation of the pair of normally non-rotating, eccentrically disposed, circular cams and how they are mounted for independent rotation of the gyrating-mass support structure. Also illustrated is the method of connecting the gyrating masses to the cams and how the cams are rotated to change the direction of the resultant unbalanced force.

Referring now to FIG. 2, the method of varying the radius of gyration of the gyrating masses, 4, and of changing the direction of the resultant unbalanced force are illustrated. A single gyrating mass, 4, is shown connected to the pair of cams, *9a*, *9b*, by means of connecting rod 5 and cam followers 8. The gyrating mass, 4, is connected to the connecting rod, 5, by means of pin 7. The cam followers, 8, are attached to the connecting rod, 5, by means of shaft 20. Cam *9a* has a square hole, 10, which receives one end of a square shaft, 11, which protrudes from cam *9b* and which allows both cams to be rotated in unison in order to change the direction of the resultant unbalanced force which is indicated by arrow 12. Shafts, *14a*, *14b*, are attached, respectively, to cams *9a*, *9b*, and which allows those cams to be rotated independently of the gyrating-mass support structure, 1. Bearings, 15, and collars, 16, allow the independent rotation of shafts, *14a*, *14b*, and their associated cams, *9a*, *9b*. One end of shaft *14b* is attached to a spur gear, 17, which engages a worm gear, 18. The rotation of worm gear 18 causes spur gear 17, shafts *14a* and *14b*, and cams *9a*, *9b*, to rotate about their common axis of rotation thus changing the direction of the resultant unbalanced force. Drive shaft, 19, rotates the gyrating-mass support structure, 1, and the gyrating masses, 4. Counterweights, *13a*, *13b*, are attached to their respective cams, *9a*, *9b*, in order to equalize the distribution of mass about the axis of rotation of the cams. 21 is part of the frame that supports the entire device.

Referring to FIGS. *3a*, *3b*, and *3c*, a single gyrating mass, 4, is shown attached to a connecting rod, 5, by means of a pin, 7. Roller-type cam followers, 8, are mounted for rotation on shafts or rods, 20, on opposite sides of the connecting rod, 5.

Referring to FIGS. *4a* and *4b*, cam *9b* is illustrated along with its associated shaft, *14b*, square shaft 11, and counterweight *13b*.

Referring to FIGS. *5a* and *5b*, cam *9a* is illustrated along with its associated shaft *14a*, square hole 10, and counterweight *13a*.

Referring to FIG. 6, the gyrating-mass support structure, 1, is shown mounted for rotation within frame 21 by means of bearings, 15, and collars, 16. The drive shaft, 19, rotates the gyrating-mass support structure, 1, and the gyrating masses, 4, which are mounted for radial movement within the bearings or bushings, 3, which are located in the cylindrical chambers, *2a* – *2e*. The gyrating masses, 4, are attached to connecting rods, 5, by means of pins 7. Roller-type cam followers, 8, are mounted at the opposite end of and on opposite sides of the connecting rods, 5. The cam followers on each connecting rod engage the cams, *9a*, *9b*, and are rotatably mounted on the shafts or rods, 20. Square shaft 11 protrudes from cam *9b* and is inserted in a square hole in cam *9a*. Cams *9a* and *9b* are connected to shafts *14a* and *14b*, respectively, for independent rotation by means of bearings 15 and collars 16. One end of shaft *14b* is connected to spur gear 17 which engages worm gear 18. Worm gear 18 is mounted on frame 21 by the partial support 22. The direction of the resultant unbalanced force is changed by rotating worm gear 18 which in turn causes the spur gear 17, shafts *14a* and *14b*, and cams *9a* and *9b* to rotate.

Having thus described the invention, what is claimed as new is:

1. In a device that converts rotary motion into unidirectional motion by varying the radius of gyration of a plurality of gyrating masses that gyrate in a plane that is perpendicular to the axis of rotation of said plurality of gyrating masses, and in which said device includes means for supporting, rotating, and permitting sliding radial movement of said plurality of gyrating masses; an improved mechanism for varying the radius of gyration of said plurality of gyrating masses comprising:

an axis of rotation;

a pair of circular cams mounted coaxially with respect to each other, parallel with respect to said plane which contains said plurality of gyrating masses, and eccentrically with respect to said axis of rotation of said plurality of gyrating masses, said pair of circular cams being normally non-rotating with respect to said means for supporting, rotating, and permitting sliding radial movement of said plurality of gyrating masses;

a connecting rod attached to each gyrating mass of said plurality of gyrating masses;

a pair of cam followers rotatably mounted on the free end of and on opposite sides of each of said connecting rods and in such a manner that each cam follower of the said pair of cam followers engages one of the said pair of circular cams.

2. A device as set forth in claim 1 in which said pair of normally non-rotating circular cams are rotatably mounted with respect to said means for supporting, rotating, and permitting sliding radial movement of said plurality of gyrating masses, and which said device includes means for rotating said pair of circular cams with respect to said axis of rotation of said plurality of gyrating masses in order to selectively change the direction of the resultant unbalanced force produced by the rotation of said plurality of gyrating masses.

3. A device as set forth in claim 2 and which said device includes means for preventing changes in the distribution of mass of a craft or vehicle, which is being propelled by said device, when the direction of the resultant unbalanced force is changed by rotating said pair of normally non-rotating circular cams, said means comprising;

a counterweight attached to each of said pair of circular cams and in such a manner that the combined mass of said circular cam and said counterweight is equally distributed about said axis of rotation of said plurality of gyrating masses.

* * * * *